United States Patent [19]
Gupta et al.

[11] 3,854,036
[45] Dec. 10, 1974

[54] TAG READER TO DIGITAL PROCESSOR INTERFACE CIRCUIT

[75] Inventors: Gokal C. Gupta, Fremont; John M. Hunt, Hillsborough, both of Calif.

[73] Assignee: The Singer Company, New York, N.Y.

[22] Filed: Feb. 27, 1974

[21] Appl. No.: 446,580

[52] U.S. Cl. .......................... 235/61.11 E, 360/42
[51] Int. Cl. .......................... G11b 5/09
[58] Field of Search .......... 360/117, 42, 43, 51, 44; 235/61.11 D, 61.11 E, 61.11 F

[56] References Cited

UNITED STATES PATENTS

| | | | |
|---|---|---|---|
| 3,720,927 | 3/1973 | Wolf | 360/44 |
| 3,752,963 | 8/1973 | Herrin | 235/61.11 E |
| 3,784,792 | 1/1974 | Dobras | 235/61.11 E |

*Primary Examiner*—Vincent P. Canney
*Attorney, Agent, or Firm*—Edward L. Bell; Joseph R. Dwyer; Linval B. Castle

[57] ABSTRACT

Circuitry particularly suitable as an interface between a merchandise tag reader, or the like, and a digital computer. Tag readers which may be used by store clerks or market checkers to read the merchandise code printed on a product or label may be operated over vast ranges, e.g., between four and sixty inches per second. In most cases, depending upon the code used, the bit value of a pulse read over this range of speed can only be determined by comparing the width of a pulse with the width of an adjacent pulse. The disclosed circuitry produces compressed digital data by generating a binary number representing the logarithm of the width of each pulse so that a required ratio of present to previous pulse widths can easily be obtained by a simple subtraction process.

7 Claims, 3 Drawing Figures

TAG READER TO DIGITAL PROCESSOR INTERFACE CIRCUIT

Digital computing equipment that was primarily used in the past for very complex arithmetic calculations is, because of the great memory capacities, becoming increasingly popular with retail trade establishments. These computers are now asked to maintain perpetual inventories of items in stock, provide price and cost information, compute taxes due on taxable sales as well as many other functions such as accounting and payroll computations.

Among one of the more important recent computer developments for the retail trade industry is the point-of-sale terminal through which a sales clerk may enter into the sales register information such as quantity and stock number so that the computer, which may be located elsewhere, may transmit an indication to the clerk and to the customer the price and sales tax information and may also, in addition, adjust the stock inventory for the particular item and maintain records on the total sales at the particular terminal, total taxes due, etc.

In order to simplify the entry of point-of-sale terminal information and to increase the speed and accuracy of the transaction, it seems that the next advance in the art should be to provide the sales clerk with some means for very rapidly and automatically entering stock number information into the computing system and thus eliminate or at least appreciably reduce the probability of human error. This, of course, may be done by a magnetic or optical reader, or the like, which may read coded information from a product label. U.S. Pat. No. 3,723,669, describes a hand-held magnetic transducer adapted to be swept across a product tag or label containing a magnetic code. This type of scanner as well as optical scanners such as those used in connection with other systems, such as Universal Product Code adopted by the grocery industry, provides the same type of binary stock number data. These point-of-sale terminal scanners which may be required to read a stock number of the product being sold, are coupled into the digital computer or processor which processes the data and returns price and other necessary data to a point-of-sale terminal display while it remembers, for inventory and accounting purposes, quantity, stock number, size, color, price, sales tax, etc.

Tag or label information read by a point-of-sale terminal scanner is generally binary information in that the data is recorded in only two magnetic or optical states. The information sensed, however, is not directly usable by a digital computer because the greatly varying scan speeds at which a scanner may be swept over the product code produce data that is not coordinated with the accurately clocked circuitry of a digital computer or processor. For example, one clerk may slowly sweep the scanner over the product code at a speed of only five inches per second whereas another clerk may scan the identical code at a fast sixty inches per second. The digital processor which operates at a fixed clocked frequency and with a fixed data bus must receive its information at a corresponding fixed frequency; it is, therefore, clear that there must be some interface circuitry that will convert those random "analog" pulses sensed by the scanners into a digital language acceptable to the digital processor.

The invention disclosed and claimed herein is for the analog-to-digital translator or converter that provides the interface between the binary scanner and digital computer.

To measure the relative width of a cell, that is, the space between magnetic flux reversals or the width of an optical pulse or space, and thus to determine whether a scanner is reading a binary "1" or "0," it is necessary to compare the width of the present cell with an adjacent cell, preferably the next previous cell. If the ratio is roughly one to one, two to one, or one to two, it is possible to accurately determine the value of the present binary bit based on the value of the previous bit. An obvious further advantage in obtaining a ratio of cell widths is that variations in the point-of-sale terminal scanning speeds which may vary widely from clerk to clerk, are divided out and disappear from further consideration. This is because the present cell was read at approximately the same speed as the next previous cell irrespective of the overall scanning speed and, therefore, the ratio of present cell width to the next previous cell width will be identical at all overall scanning speeds if both are of the same binary value. Unfortunately, ratios are slow, difficult, and costly to obtain in a digital processor. To overcome these disadvantages, the present invention converts a number count representing a cell width into a value representing its logarithm. Thus, the processor receiving this compressed data need only perform a subtraction of the logarithm of the present cell width from that of the next previous cell width to obtain the necessary ratio for determining a bit value.

Briefly described, the present invention comprises a linear counter which is actuated by the input signal from a point-of-sale terminal scanner. A count produced by the counter will, therefore, represent the width of a product tag cell, such as the spacing between magnetic flux changes, or the width of optical pulse bars of spaces. The linear count is introduced into a read-only-memory that is programmed to produce an output number representing the logarithm of the linear input count. This logarithmic number is then held in a register for use by subsequent processor circuitry which determines the "value" of each input signal pulse by comparing the width of the pulse with the width of the previous pulse. The comparison is made by merely subtracting the logarithmic numbers representing the widths of the pulses. Novel use of a multiplexing circuit in conjunction with the read only memory (ROM) has the effect of expanding the capacity of the inexpensive and common 256 × 8 ROM to a total 5120 logarithmic numbers thereby accommodating a wide range of input counts and greatly varying scanning speeds with reasonable costs and with relative circuit simplicity.

BRIEF DESCRIPTION OF THE DRAWINGS

In the drawings which illustrate a preferred embodiment of the invention.

DESCRIPTION OF THE PREFERRED EMBODIMENT

Figure 1:
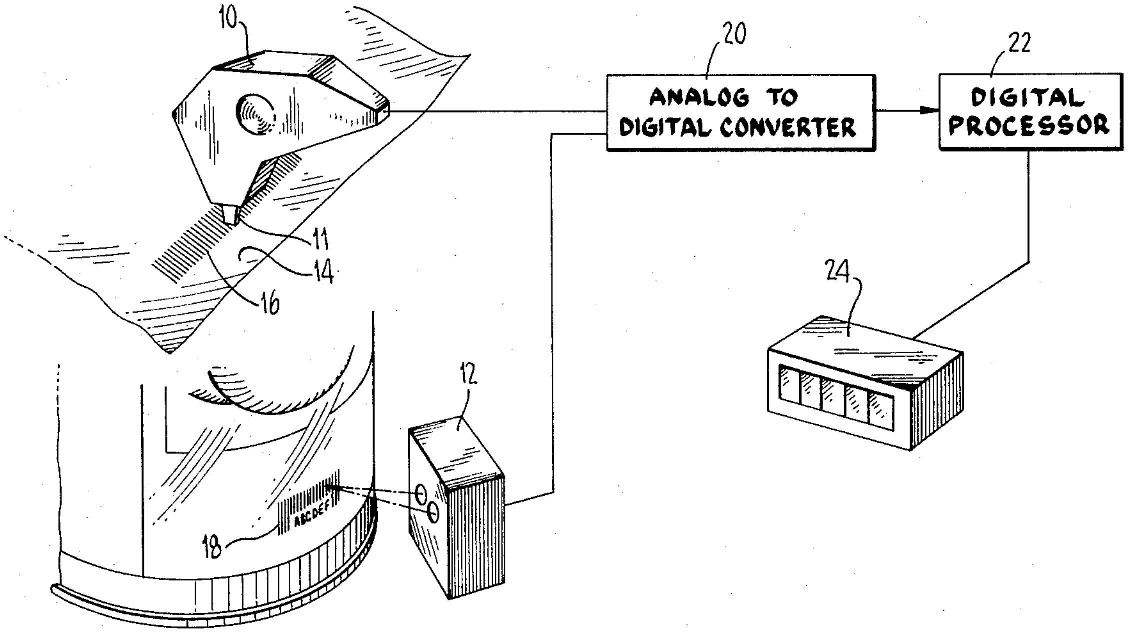
FIG. 1 is a pictorial block diagram illustrating a typical point-of-sale processor system and the location of the digital converter of the present invention in that system.

Turning now to a detailed description of the invention, FIG. 1 is a pictorial diagram, partly in block form, of a point-of-sale terminal processing system that may be used, for example, for a retail merchandising operation. Illustrated in the figure are sensors such as a magnetic scanner 10 or an optical scanner 12, each positioned to sense a coded pattern which may be presumed to contain a stock number of the product to which the code is attached. The magnetic scanner 10 operates by moving the magnetic transducing head 11 across a label 14 which may be a strip of magnetic recording tape containing a code 16 magnetically coded therein. The optical scanner 12 is shown positioned to scan printed bars 18 arranged to form a code such as the Universal Product Code developed for the grocery industry.

Scanners such as the magnetic scanner 10 are designed to be operated by a sales clerk who manually passes the scanner over the coded section. Because of this manual operation, the scanning speeds may widely vary over a range of between four inches a second and sixty inches per second. It is apparent, therefore, that the information received by the scanner, while in binary form is not directly suitable as an input to a digital computer or processor requiring properly clocked binary data. The signal from the scanner 10 is actually an analog signal which must be converted or translated into proper digital language before it is usable. Therefore, scanners 10 and 12 are shown connected to an analog to digital translator or converter 20 which acts as an interface unit to convert the binary signals from the scanner into the proper digital language acceptable to the digital processor 22. Upon receiving the signal representing the stock number of the product to which the binary coded label 14 is attached, the digital processor 22 may make the appropriate reduction adjustments to the stock inventory and will display price, tax, and other required information on the display unit 24 positioned at the point-of-sale terminal.

Figure 3:
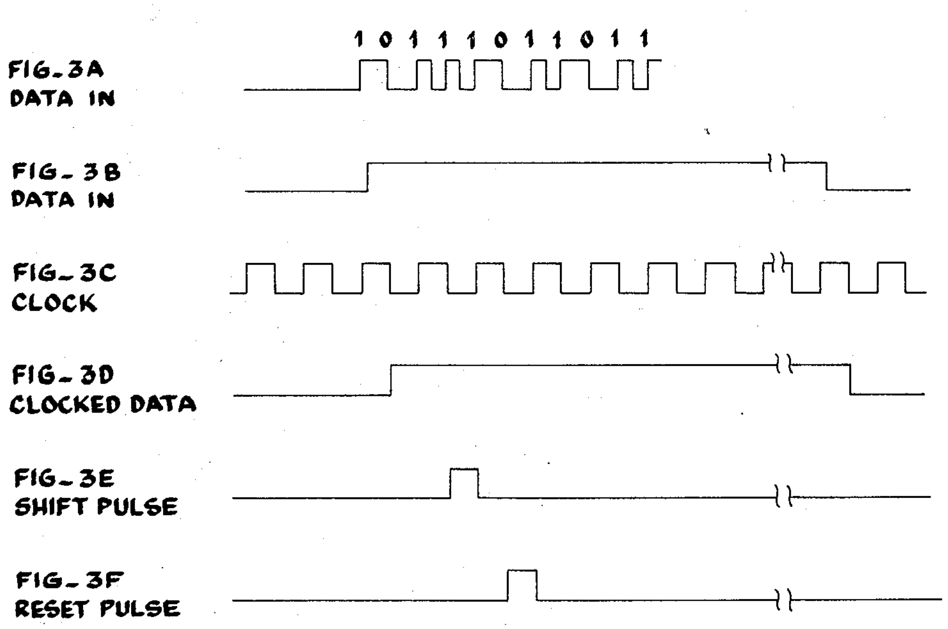
FIG. 3 is a set of curves illustrating waveforms at various points throughout the diagram of FIG. 2.
Figure 2:
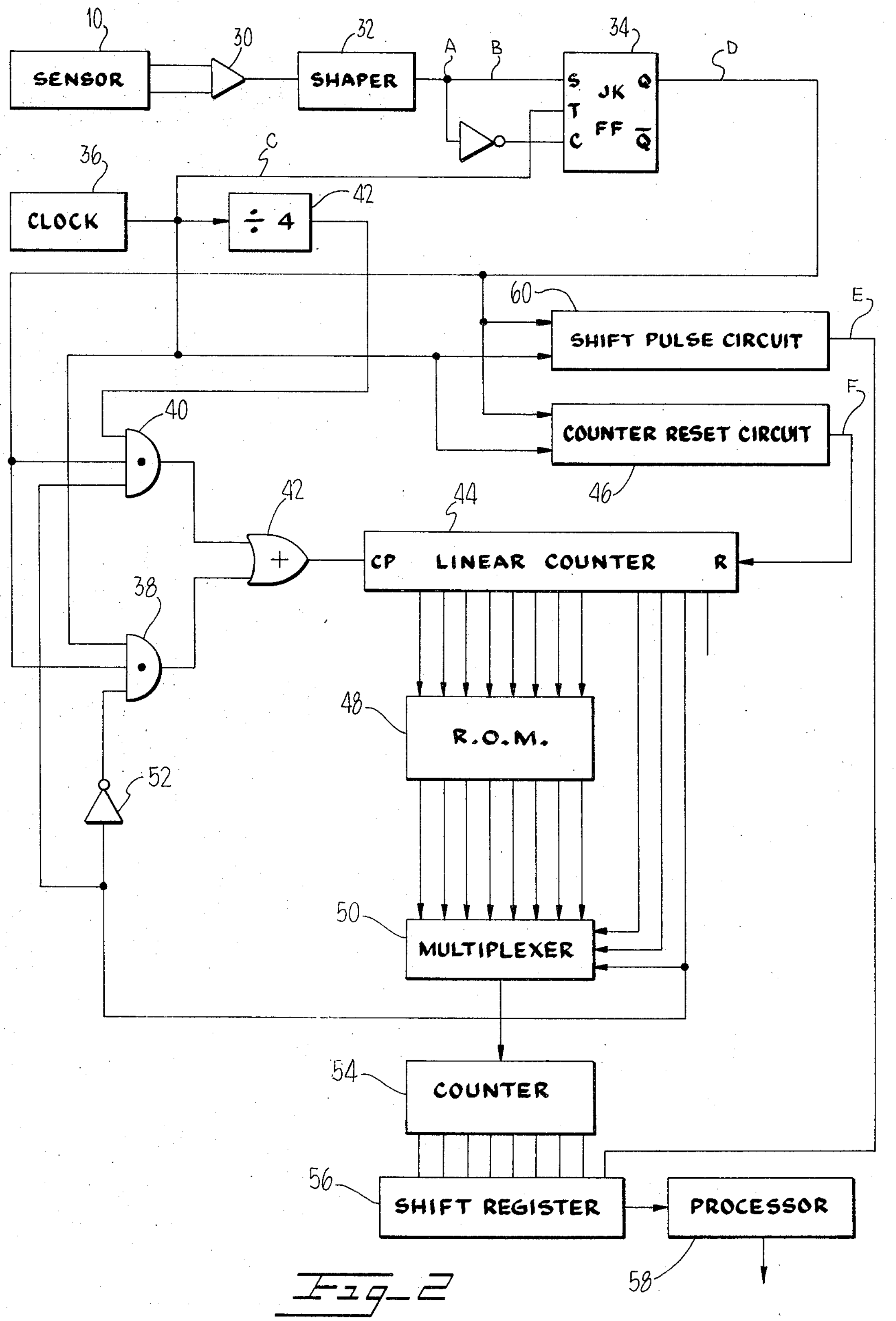
FIG. 2 is a block diagram of the digital converter of the invention.

FIG. 2 is a diagram illustrating, in block form, the analog to digital converter 20 of FIG. 1. In the description of FIG. 2 reference will be made to the various waveforms of FIG. 3 which are typical of those produced at various points in the diagram of FIG. 2. It will be noted in FIG. 3 that the type of code used in describing the preferred embodiment is the Manchester Code in which one wide flux reversal per bit cell represents a value that is the inverse of the next previous bit value, and in which two narrow reversals per cell represent a value that is identical with the next previous bit value. It is apparent, therefore, that to accurately read such a code with a widely varying scan speed, it is necessary only to continually compare widths of the present pair of flux reversals with the next previous pair.

A scanner is typically operated at a scan speed of between four inches per second and sixty inches per second. The magnetic or optical bars being scanned typically have a width of between 0.006 and 0.015 inch. Therefore, the actual read times, or counting speeds required of the analog to digital converter circuitry 20 will typically be between 7.5 milliseconds (scanning a 15 mil bar at 4 inches per second) and 100 microseconds (scanning a 6 mil bar at 60 inches per second). This very wide range of scanned speeds is accepted by the converter 20 and converted into a logarithmic number which may be subtracted in the subsequent digital processor 22 to obtain a ratio of counts of the present bit to the next previous bit and hence the readout of the code scanned by sensor 10.

Proceeding with the detailed description of FIG. 2, sensor 10, which may be the magnetic transducer 10 or optical scanner 12 of FIG. 1, is coupled through a suitable amplifier 30 and shaper circuitry 32 to obtain at its output, A, a substantially square wave representation of the code read by sensor 10, as shown in FIG. 3A. The curve illustrated in FIG. 3B represents a very greatly expanded section of one portion of the waveform of FIG. 3A. The signal having this waveform is applied to one control input of a JK flip-flop 34 while the other control input is coupled to receive the inverted signal as shown in FIG. 2. A clock 36, operating at a frequency of 450 KHz, is coupled to the signal input terminal of flip-flop 34 so that the output signal, as shown in FIG. 3D, goes positive with the first negative going pulse from clock 36 after the control signals are applied to the flip-flop. The output signal of flip-flop 34 will then remain positive until the first negative going clock signal after the signal at point B drops from a "1" to a "0," as shown in FIGS. 3B, 3C, and 3D.

The signal D, therefore, becomes the equivalent of one of the positive going pulses of FIG. 3A, but is now synchronized with the output of a clock 36.

The clocked output signal D, from flip-flop 34 is applied to the inputs of AND gates 38 and 40. A second input to AND gate 38 is obtained from the 450 KHz output of clock 36 and a second input to AND gate 40 is obtained from the 112.5 KHz output of a divide-by-four circuit 42 coupled to the output of clock 36. As will be subsequently explained, the third inputs to AND gates 38 and 40 are derived from the eleventh bit of a 12-bit linear counter 44.

The output terminals of AND gates 38 and 40 are applied to the input of OR gate 42, the output of which is applied to the input control terminal of the 12-bit linear counter 44. A counter reset circuit 46 that operates in response to the output of clock 36 and the output signal, D, from flip-flop 34 generates a reset pulse as shown in FIG. 3F. This signal, F, will reset the linear counter 44 within four or five microseconds after the counter receives the first input control pulse from OR gate 42.

The first eight bits of the 12-bit linear counter 44 address a 256 × 8 read-only-memory (ROM) 48 which produces a series of output pulses corresponding to the logarithm of the number of input pulses, as will be subsequently explained. The eight output lines from ROM 48 are coupled to a multiplexer 50 which contains switching gates controlled by the ninth, tenth, and eleventh bits of counter 44, so that the eight output lines are read in series and ROM 48 is, in effect, operated as a 2048 × 1 unit. The output of multiplexer 50 is applied to a log counter 54, the output of which is applied to a shift register 56 where the logarithmic data is temporarily stored until it is accepted by a digital processor 58.

As sensor 10 is swept across a binary coded tag, and linear counter 44 generates an increasing number of counts, the "significance" of each single number decreases and the total accuracy of the system is not materially decreased if counter 44 counts every fourth clock pulse after the total count reaches 1024. Accordingly, the eleventh bit of counter 44 is connected to AND-gate 40 and through inverter 52 to AND-gate 38 so that when the eleventh bit goes high, AND-gate 38 is disabled and gate 40 is enabled to pass the 112.5 KHz pulses from divider circuit 42 to the counter 44. The counter may then continue its linear count until the ninth, tenth, and eleventh bits of counter 44 are all high, but because of the quarter frequency count after the counter has reached a total of 1024, the counter will have counted, and ROM 48 will have generated a corresponding logarithmic output count over a period corresponding to a total linear count of 5120 clock pulses.

As previously indicated, multiplexer 50 permits the 256 × 8 ROM 48 to be operated as a 2048 × 1 read-only-memory. When linear counter 44 is still counting in the first eight bits and the ninth, tenth, and eleventh bits are still low, multiplexer 50 passes only the first line of the eight output lines of ROM 48. As the count in counter 44 advances to the point where the ninth bit is high, the gating circuits in multiplexer 50 pass the data recorded on the second line of the eight output lines of ROM 48. After the second output line has passed multiplexer 50 and entered counter 54, the remaining eight lines of ROM 48 pass through multiplexer 50 in series to counter 54 until the input data from sensor 10 signals the counter 44 that the count must stop; the data is put into the shift register 56 by the shift pulse circuit 60 and is later transferred to the processor 58, and that linear counter 44 must be reset by the counter reset circuit 46.

Each of the eight output lines of ROM 48 are "programmed" so that the eight lines, in series, emit pulses corresponding to the logarithm of the entire input address to ROM 48; the first output line produces a count corresponding to the logarithm of the first 256 input address lines; the second output line for input addresses between 256 and 512, etc. While the actual logarithmic programming of ROM 48 may be done to suit the particular processing equipment, the factor used to program the memory in the disclosed embodiment was the constant, 66, times the logarithm to the base 10 of the input number minus the logarithm of twenty. The number, twenty, was selected because there was no desire to count the first twenty counts from linear counter 44 so that the first actual output from ROM 48 would occur on the twenty-first count. The constant, 66, was selected so that at the very low linear count (i.e., 21 through 40), the logarithmic count increases nearly linearly, one logarithmic count per linear count.

After the linear count has reached a total of 256, the first line of the eight output lines of ROM 48 has transmitted a total of 73 pulses which, according to the programming of the ROM in the embodiment being described, corresponds to a linear count of 251. At this time the second output line of ROM 48 is enabled by multiplexer 50 and during the next 256 linear counts this output line only emits 20 pulses for a total of 93 pulses, which number represents the linear count of 512 in the particular factor used in the embodiment being described. It can, therefore, be seen that as multiplexer 50 enables each of the eight output lines of ROM 48, the logarithmic output number continues to increase and that the number of pulses produced effectively represents the logarithm of the linear counts applied to ROM 48.

Counter 54 and register 56 should have the capability of accommodating the total logarithmic output count of ROM 48. In the embodiment described there are a total of 153 output log counts for a linear input count of 4096. This, therefore, requires an 8-bit counter 54 and an 8-bit shift register 56 to store the necessary data. It thus becomes apparent that there is a substantial savings over a 12-bit bus that would normally be required if the data were not logarithmically compressed as described.

The output of register 56 is applied to a processor 58 which contains circuitry for comparing the widths of each pulse with that of the next previous pulse. Since the numbers in register 56 are logarithmic representations of the pulse widths, the comparision circuitry in register 56 must perform only a subtraction to obtain the required ratios. These subtractions may be performed by the use of up-down counters or by several other methods well known in the art. By performing such a comparison, the processor thus determines whether a binary input pulse read by the sensor is wide or narrow and therefore whether it represents a binary "1" or "0." Subsequent digital computer circuitry coupled to the output of processor 58 then performs the necessary arithmetic computations and memory functions to transmit the required data to the terminal display 24 and to make necessary stock inventory and accounting corrections and computations.

What is claimed is:

1. Circuitry for determining the values of binary signal pulses serially introduced to the circuitry at varying speeds and pulse widths, said circuitry comprising:

input means for receiving the binary signal pulses;

counting means coupled to said input means for generating a count signal representing the width of each one of said pulses;

converting means coupled to said counting means and responsive to said count signal for generating a number representing the logarithm of said count signal; and comparison means coupled to said converting means for comparing the logarithmic number generated for each binary signal pulse with the number generated for a neighboring binary signal pulse of known value.

2. The circuitry claimed in claim 1 wherein said comparison means compares by subtracting the logarithmic number generated for a binary signal pulse with the number generated for the next previous binary signal pulse.

3. The circuitry claimed in claim 1 wherein said counting means includes a clock, a linear counter, and first gating means for gating the clock signal and each binary signal pulse to the input of said linear counter.

4. The circuitry claimed in claim 1 wherein said converting means includes a read-only-memory constructed to generate output pulses according to the equation: $Po = K \log (Pi - c)$; wherein $Po$ = number of output pulses; $Pi$ = number of input counts from said counting means; $K$ = constant; and $c$ = desired number of input counts before the first output pulse is to be generated.

5. The circuitry claimed in claim 3 wherein said converting means includes a read-only-memory having a plurality of output lines, and a multiplexer coupled to said plurality and controlled by the state of at least one of the more significant counts of said linear counter for passing in series through said multiplexer the logarithmic count appearing on each output line of said plurality.

6. The circuitry claimed in claim 3 further including a frequency dividing circuit coupled to said clock for dividing the clock frequency by an integer, and second gating means coupled to said dividing circuit, to said input means, to said first gating means, and to one of the more significant count terminals of said linear counter for disabling said first gating means and for reducing the counting frequency of said linear counter when the count in said counter has enabled said more significant count terminal.

7. The circuitry claimed in claim 3 wherein said input means includes amplifying and pulse shaping circuitry.

* * * * *